United States Patent
McQueen et al.

(10) Patent No.: US 10,060,785 B2
(45) Date of Patent: Aug. 28, 2018

(54) SYSTEMS AND METHODS OF ALTERNATE OPERATION FOR A SCANNER-SCALE HAVING AN ITEM OVERHANG DETECTION SYSTEM

(71) Applicant: Datalogic USA, Inc., Eugene, OR (US)

(72) Inventors: Alexander M. McQueen, Eugene, OR (US); Matt D Schler, Eugene, OR (US)

(73) Assignee: DATALOGIC USA, INC., Eugene, OR (US)

( * ) Notice: Subject to any disclaimer, the term of this patent is extended or adjusted under 35 U.S.C. 154(b) by 40 days.

(21) Appl. No.: 14/493,220

(22) Filed: Sep. 22, 2014

(65) Prior Publication Data

US 2015/0090503 A1   Apr. 2, 2015

Related U.S. Application Data

(60) Provisional application No. 61/885,997, filed on Oct. 2, 2013.

(51) Int. Cl.
*G01G 23/00* (2006.01)

(52) U.S. Cl.
CPC .................. *G01G 23/00* (2013.01)

(58) Field of Classification Search
CPC .... G01G 19/4144; G01G 19/52; G01G 23/00; G07G 1/0045; G07G 1/0072
See application file for complete search history.

(56) References Cited

U.S. PATENT DOCUMENTS

| | | | |
|---|---|---|---|
| 4,000,397 A | 12/1976 | Herbert et al. | |
| 4,716,281 A | 12/1987 | Amacher et al. | |
| 4,881,606 A | 11/1989 | Halfon et al. | |
| 5,058,691 A * | 10/1991 | Sela | G01G 19/52 177/253 |
| 5,143,164 A | 9/1992 | Nahar | |
| 5,260,554 A | 11/1993 | Grodevant | |
| 5,367,291 A | 11/1994 | Fockens | |

(Continued)

FOREIGN PATENT DOCUMENTS

| | | |
|---|---|---|
| EP | 0967 565 A2 | 12/1999 |
| EP | 1039 275 A1 | 9/2000 |

(Continued)

OTHER PUBLICATIONS

Perkin Elmer Technical Note TN1000, "What is a Lock-in Amplifier?", 2000, 4 pages.

(Continued)

*Primary Examiner* — Natalie Huls
(74) *Attorney, Agent, or Firm* — Stoel Rives LLP

(57) ABSTRACT

In a scanner-scale system for passing items through a read zone over a weigh platter of the scanner-scale, the system including an item overhang detection system operable for providing an output upon sensing that an item overhangs beyond an edge of the weigh platter, systems and methods are disclosed for using output from the item overhang detection system to both (1) reduce erroneous weighing upon sensing that an item overhangs beyond an edge of the weigh platter (such as by alerting the operator that an item overhang condition has been detected and thus prompting the operator to reposition the item so as to be fully on scale) and (2) initiate an alternate function of the scanner-scale independent of weighing operation.

20 Claims, 7 Drawing Sheets

(56) References Cited

U.S. PATENT DOCUMENTS

| | | | |
|---|---|---|---|
| 5,410,108 A | 4/1995 | Williams et al. | |
| 5,446,271 A | 8/1995 | Cherry et al. | |
| 5,463,211 A | 10/1995 | Arends et al. | |
| 5,747,744 A | 5/1998 | Kraft et al. | |
| 5,773,767 A * | 6/1998 | Collins, Jr. | G01G 21/28 177/124 |
| 6,080,938 A | 6/2000 | Lutz | |
| 6,085,979 A | 7/2000 | Maddox | |
| 6,092,838 A | 7/2000 | Walker | |
| 6,155,489 A * | 12/2000 | Collins, Jr. | G07G 1/0045 235/462.01 |
| 6,237,852 B1 | 5/2001 | Svetal et al. | |
| 6,297,750 B1 | 10/2001 | Wingate et al. | |
| 6,330,973 B1 | 12/2001 | Bridgall et al. | |
| 6,332,573 B1 * | 12/2001 | Gu | G06K 9/209 235/462.06 |
| 6,332,575 B1 | 12/2001 | Schuessler et al. | |
| 6,354,498 B1 | 3/2002 | Lutz | |
| 6,416,183 B1 | 7/2002 | Colpaert et al. | |
| 6,547,040 B2 | 4/2003 | Goodwin, III | |
| 6,707,381 B1 | 3/2004 | Maloney | |
| 7,050,043 B2 | 5/2006 | Huang et al. | |
| RE40,071 E | 2/2008 | Svetal et al. | |
| 7,347,367 B2 | 3/2008 | White | |
| 8,317,101 B2 * | 11/2012 | Herwig | G01G 19/4144 235/439 |
| 8,552,313 B2 | 10/2013 | Atwater et al. | |
| 8,556,175 B2 | 10/2013 | McQueen et al. | |
| 8,561,902 B2 | 10/2013 | McQueen et al. | |
| 8,833,659 B2 | 9/2014 | McQueen et al. | |
| 9,245,425 B2 * | 1/2016 | Drzymala | G07G 1/0072 |
| 9,347,819 B2 | 5/2016 | McQueen | |
| 2003/0010541 A1 * | 1/2003 | Oldendorf | G01G 23/00 177/25.13 |
| 2004/0035928 A1 | 2/2004 | Anderson | |
| 2005/0103850 A1 | 5/2005 | Mergenthaler et al. | |
| 2007/0102513 A1 | 5/2007 | Scheb | |
| 2007/0152061 A1 * | 7/2007 | Blanford | G06K 7/10792 235/462.32 |
| 2008/0169347 A1 | 7/2008 | Olmstead | |
| 2008/0255790 A1 | 10/2008 | Roquemore et al. | |
| 2010/0116887 A1 * | 5/2010 | Barkan | G06K 7/10722 235/440 |
| 2010/0123005 A1 * | 5/2010 | Guess | G06K 7/10871 235/383 |
| 2010/0139989 A1 * | 6/2010 | Atwater | G01G 19/4144 177/245 |
| 2011/0121950 A1 | 5/2011 | Izadi et al. | |
| 2011/0132985 A1 * | 6/2011 | McQueen | G01G 19/4144 235/454 |
| 2011/0163996 A1 | 7/2011 | Wassvik et al. | |
| 2013/0075168 A1 * | 3/2013 | Amundsen | G01G 23/00 177/1 |

FOREIGN PATENT DOCUMENTS

| | | |
|---|---|---|
| JP | 11-203385 A | 7/1999 |
| JP | 2000-028424 | 1/2000 |
| JP | 2006-154738 A | 6/2006 |
| JP | 2008-524587 | 7/2008 |
| KR | 10-2011-0039282 A | 4/2011 |
| WO | WO 02/33647 A1 | 4/2002 |
| WO | WO 2005-038506 A1 | 4/2005 |

OTHER PUBLICATIONS

International Patent Application No. PCT/US2010/058604, International Preliminary Report on Patentability and Written Opinion dated Jun. 21, 2012, 8 pages.

International Patent Application No. PCT/US2012/040605, International Preliminary Report on Patentability and Written Opinion dated Dec. 19, 2013, 8 pages.

Atwater et al., U.S. Appl. No. 12/634,252, filed Dec. 9, 2009 (corresponds to U.S. Pat. No. 8,552,313 cited above).

Atwater et al., U.S. Appl. No. 14/047,156, filed Oct. 7, 2013 (continuation of U.S. Pat. No. 8,552,313 cited above).

* cited by examiner

Fig. 6   Note: "Reset DRT" means set DRT to zero;
"Restart DRT" means set DRT to maximum value

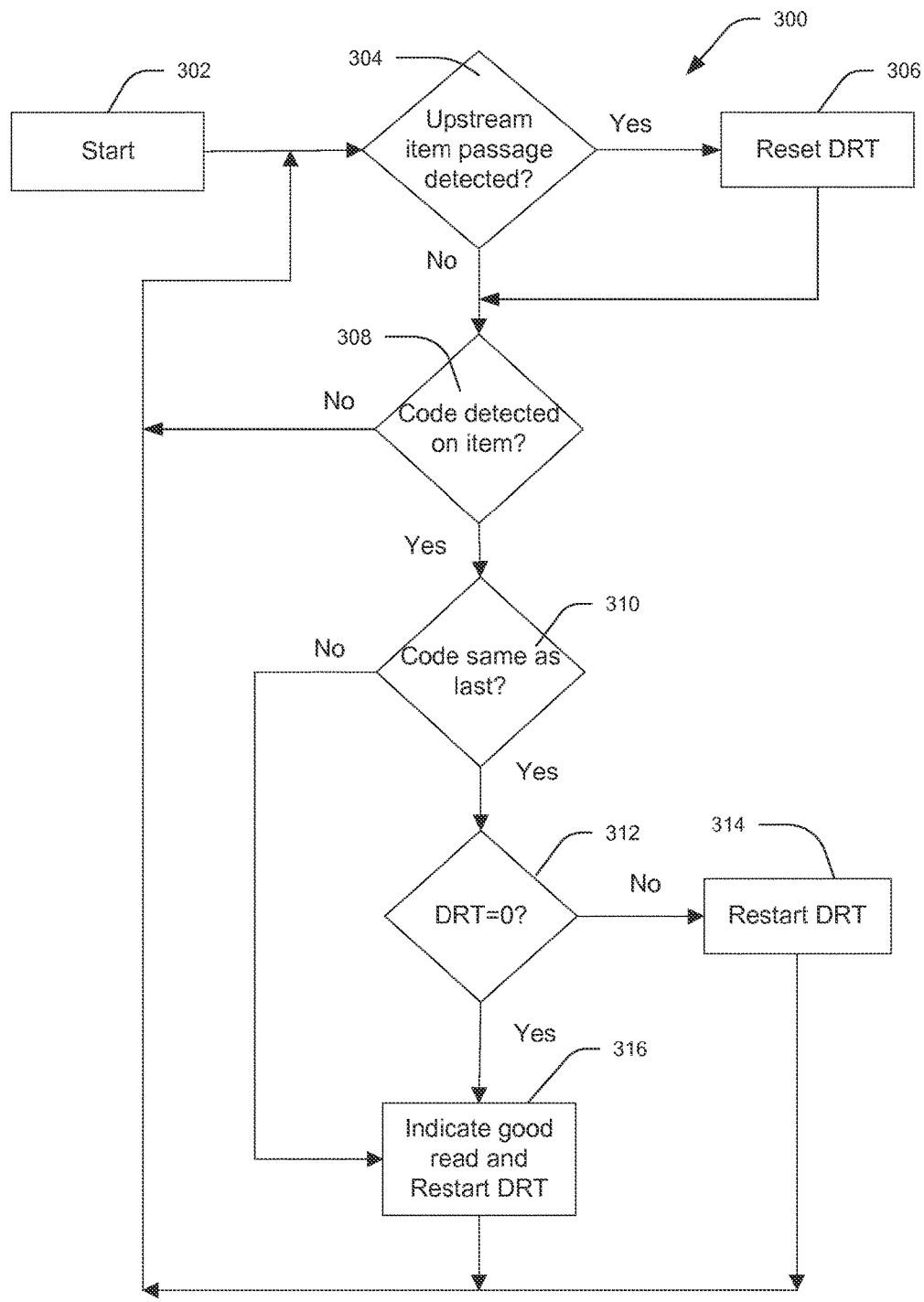
Fig. 8   Note: "Reset DRT" means set DRT to zero;
"Restart DRT" means set DRT to maximum value

SYSTEMS AND METHODS OF ALTERNATE OPERATION FOR A SCANNER-SCALE HAVING AN ITEM OVERHANG DETECTION SYSTEM

RELATED APPLICATION DATA

This application claims priority under 35 U.S.C. § 119(e) to U.S. Provisional Application No. 61/885,997 filed on Oct. 2, 2013, hereby incorporated by reference.

BACKGROUND

The field of present disclosure relates to using object field detection in data reading systems.

Data readers such as barcode scanners typically include a scale apparatus for measuring weights of produce and other items sold by weight. The scale apparatus typically has a load cell and a weigh platter which rests on the load cell. The weigh platter is typically flush mounted with the top surface of a checkout counter. Such a flush mounted weigh platter exposes the scale to inaccurate weighing when articles placed on the scale extend beyond the perimeter of the scale surface and onto the checkout counter. In such a situation, where the item comes to rest partly on the top surface of the checkout counter the scale would record a weight value less than the actual/correct weight of the item, namely a lower weight than the item actually weighs resulting in a loss of revenue for the retailer due to this inaccurate weighing.

Several off-scale/item overhang sensing devices have been proposed. One such system includes a light source that generates a light beam and a plurality of mirrors directing the light beam along a path around a perimeter of the weigh platter and then to a detector. The detector receives the light beam and an alarm coupled to the detector is operative for alerting an operator when the item is placed in the light beam path. Other detection systems employ specialized beam paths for the light beam comprising light pipes. These off-scale detection systems are operative to detect when an item extends over or beyond a perimeter of the scale and then perform/initiate corrective steps for ensuring an accurate weighing operation.

Heretofore item overhang detection systems have been used to detect when an item extends over or beyond a perimeter of the scale solely for the purpose of correcting weighing operation such as by alerting the operator of the overhang condition and/or by delaying the weighing operation to provide the operator the opportunity to reposition the item and correct for the overhang condition. The present inventors have recognized other functional operations employing these item overhang scale detection systems.

SUMMARY

The present disclosure is directed to systems and methods for employing item overhang or off-scale detection systems in scanner-scale data reading systems. In one example, the scanner-scale employs a multi-function operating scheme whereby output from the item overhang detection system is used to both (1) reduce erroneous weighing upon sensing that an item overhangs beyond an edge of the weigh platter (such as by alerting the operator that an item overhang condition has been detected and thus prompting the operator to reposition the item so as to be fully on scale) and (2) initiate an alternate function of the scanner-scale, such as for example a function that is independent of weighing operation. Examples of the alternate function may include: using the output from the item overhang detection system as a wake-up signal for prompting the scanner-scale to switch from the sleep state to an active state; using output from the item overhang detection system to monitor item scan speed such as by sensing an item passing by an upstream edge of the weigh scale and subsequently sensing the item passing a downstream edge of the weigh scale; using output from the item overhang detection system to monitor operator scanning technique by sensing progression of an item passing successive edges of the weigh scale; using output from the item overhang detection system to assist in operation of item double-read control. Alternately, an item tracking system (such as one detecting items entering and exiting a read zone) that is not an overhang detection system may be employed to initiate one of the above listed alternate functions.

BRIEF DESCRIPTION OF THE DRAWINGS

FIG. 8 is a flow chart of a simplified method using output of the item overhang system in combination with a double read prevention system.

DETAILED DESCRIPTION OF THE PREFERRED EMBODIMENTS

Figure 1:
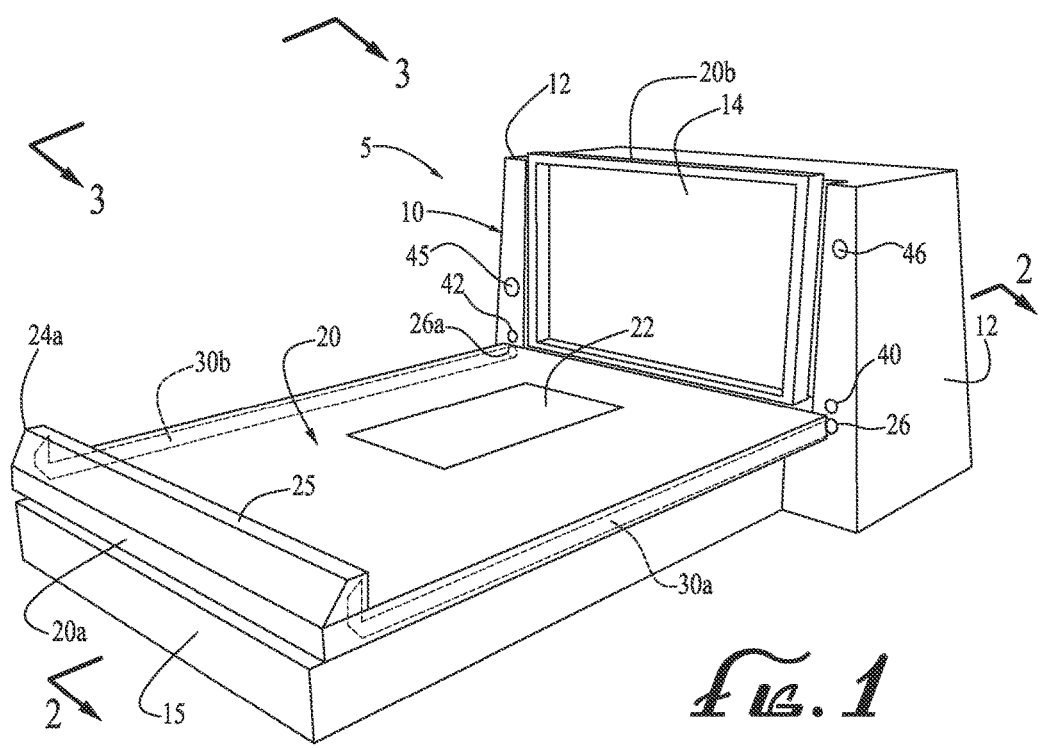
FIG. 1 is a diagrammatic front right side perspective view of an off-scale detection system according to a first embodiment.

Preferred embodiments will now be described with reference to the drawings. For clarity of description, the reference numeral representing an element in one figure will refer to the same element in any other figure.

As mentioned previously, there have been various item overhang or off-scale detection systems for scanner-scales. Certain such item overhang detection systems are described in U.S. Published Patent Nos. 2011/0232972 and 2010/0139989, hereby incorporated by reference.

Figure 2:
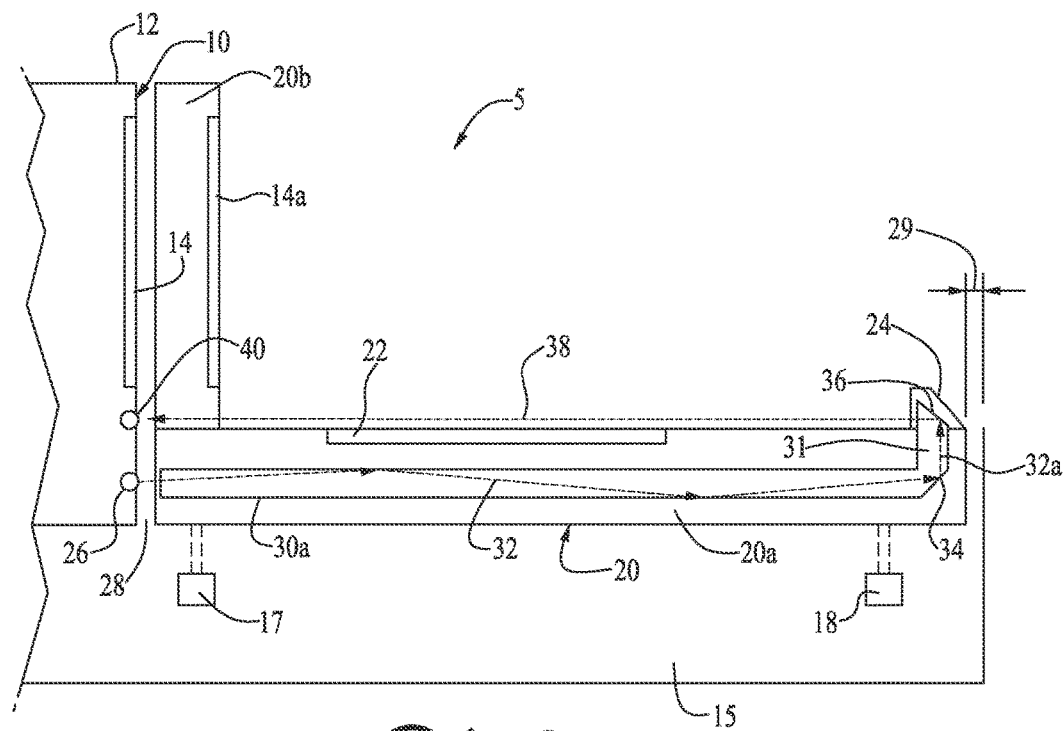
FIG. 2 is a diagrammatic cross-sectional view of FIG. 1 taken along line 2-2 illustrating the right side off-scale detection system.
Figure 3:
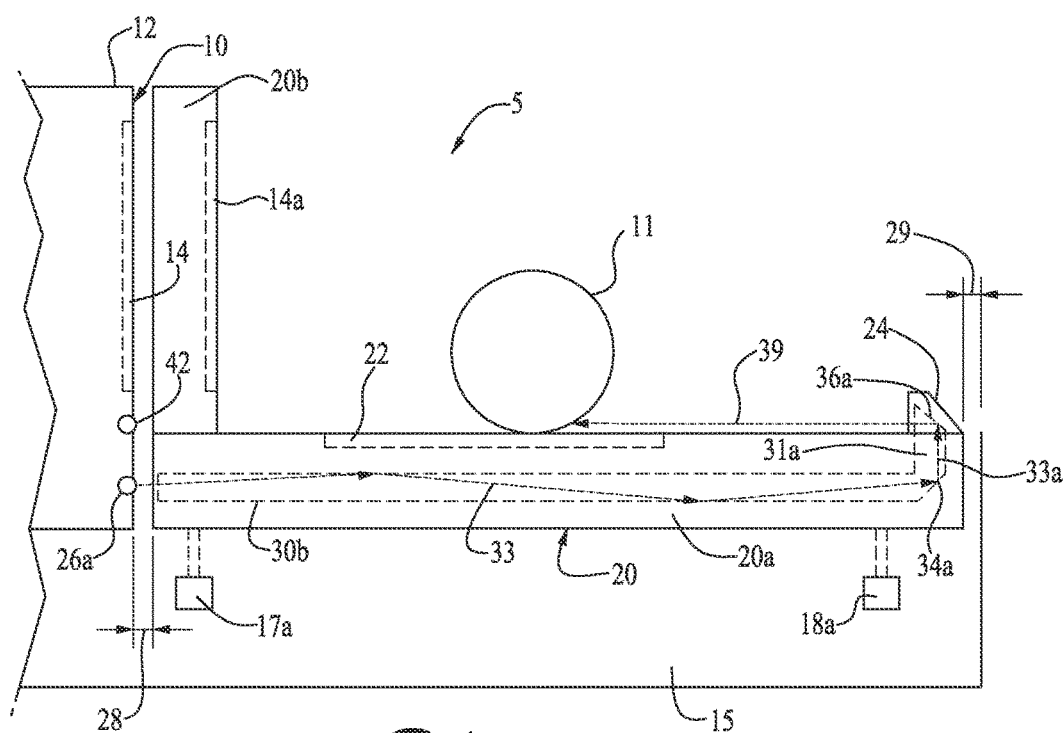
FIG. 3 is a diagrammatic side view of the system of FIG. 1 illustrating the left side off-scale detection system and further illustrating an object being detected.

FIGS. 1-3 illustrate one example of an off-scale or item overhang detection system 5. Though example systems are described in a multi-plane scanner-scale configuration, the system may be used in other scale systems such as the single window scanner-scale, a scanner-scale with either vertical or horizontal window, or in a scale system wherein the scale is separate from the scanner. Moreover, the scanner may comprise a laser-based scanner, an imaging-based scanner, an RFID reader, a combination scanner/RFID reader, or any suitable reading device.

In the illustrated embodiment of FIGS. 1-3, the off-scale system 5 is applied to a scanner-scale 10 having a lower housing section 15 and an upper housing section 12. The scanner has an upper/vertical window 14 disposed in the upper housing section 12 and a lower window 22 disposed in the lower housing section 15. The scanner-scale 10 includes a weigh platter 20 suspended via a suitable mechanism onto one or more load cell(s) 17, 18, 17a, 18a. The scanner-scale 10 in the illustrated embodiment is shown with a two-plane weigh platter 20, the weigh platter having a lower (horizontal) section 20a and an upper (vertical) section 20b. The lower (horizontal) section 20a contains the horizontal window 22 and the upper (vertical) section 20b contains the vertical window 14a. The two-plane weigh platter 20 is suspended via a suitable mechanism (e.g., a spider) onto one or more load cell(s) 17, 18. So as not to contact the stationary sections of the scanner housing, the weigh platter 20 is separated from the upper housing section 12 by a gap 28; is separated from the lower housing section 15 by gap 29; and is separated from side frame members by suitable gaps.

Each side of the weigh platter 20 is provided with an item overhang detection system. On the right side (FIGS. 1-2), a light source 26 is installed in the housing proximate the weigh platter 20 and below the plane of the horizontal portion 20a of the weigh platter 20. A light guide 30 is disposed in the weigh platter along a right side edge thereof, the light guide 30a extending from the head edge of the platter proximate the light source 26 to the foot 24 of the platter. The light guide 30a is attached to the weigh platter 20 and moves freely with it. Light 32 projected from the light source 26 passes through the air gap 28 and enters the light guide 30a thus avoiding any mechanical connection between the weigh platter and the housing containing the light source. The light 32 enters and travels within the light guide 30a and upon reaching the foot 24 of the platter is reflected upward via a reflecting feature 34, the light traveling in an upward path 32a within a vertical light pipe section 31 and is then reflected in a reverse direction via reflecting feature 36 along a return path 38 toward the detector 40 disposed on the vertical housing section 12. The reflecting features 34, 36 may comprise reflecting mirrors or may be merely angled or curved sections of the light guide 30a.

A detection system of like configuration is disposed on the left side of the weigh platter 20. As shown in FIGS. 1, 3, a light source 26a is installed in the housing proximate the weigh platter 20 and below the plane of the horizontal portion 20a of the weigh platter 20. A light guide 30b is disposed in the weigh platter along the left side edge thereof, the light guide 30b extending from the head edge of the platter proximate the light source 26a to the foot 24 of the platter. The light guide 30b is attached to the weigh platter 20 and moves freely with it. Light 33 projected from the light source 26a passes through the air gap 28 and enters the light guide 30b thus avoiding any mechanical connection between the weigh platter and the housing containing the light source. The light 33 enters and travels within the light guide 30b and upon reaching the foot 24 of the platter is reflected upward via a reflecting feature 34a, the light traveling in an upward path 33a within a vertical light pipe section 31a and is then reflected in a reverse direction via reflecting feature 36a along a return path 39 toward the detector 42 disposed on the vertical housing section 12. The reflecting features 34a, 36a may comprise reflecting mirrors or may be merely angled or curved sections of the light guide 30b.

The light guides 30a, 30b may comprise a light pipe. A light pipe is a structure of transparent material that usually is drawn or otherwise formed into an elongated shape. The elongated shape of the light pipe may be of any suitable configuration such as prismatic, cylindrical, pyramidical or conical. The light pipes 30a, 30b are illustrated with a rectangular cross-section, but the pipe configuration itself may have a polygonal (e.g., rectangular, hexagonal or square), round or oval cross-section through which light is channeled from one end to the other by total internal reflections. In some cases, the light pipe may include a tapering of its cross-sectional size from one end to the other. One example of a light pipe is an optical fiber. The light pipes 30a, 30b may be formed to include a separate lens or lens function to shape the light beam 32, 33 and/or 38, 39. Additional field-of-view controls may be provided for the detector such as baffles, apertures, lenses or combinations thereof. The light source 26 or 26a may be provided with suitable focusing optics. The light beam 32, 33 may be generated in any suitable wavelength, but is preferably in the non-visible range of near-infrared.

Referring to the left side of FIG. 3, for example, light from the light source 26a travels from the source, through the light pipe 30b reflecting off the pipe sides (as shown by path 33), up through pipe section 31a and along return path 39 to detector 42. Though the light is contained via the light pipe, once it leaves the light pipe, the light will fan out and dissipate more rapidly. FIG. 3 illustrates an item 11 positioned partly on the platter but extending off the platter and onto the counter. When an item 11 is positioned in the light path 39, light from the light source 26a is partially blocked from reaching the detector 42 and from the change in light reaching the detector 42 it is inferred (via operation of a suitable controller operatively connected to the detector) that the item may be "off-scale" and the detection system provides an output (such as an alarm, audio or visual, that is actuated notifying the operator that the item may indeed be off-scale and in contact with the counter potentially resulting in an inaccurate weighing).

Checkout scanners generally employ audible signals for notifying the operator of various events. The most common signal is the "beep" tone indicating that a barcode on an item has been successfully read by the scanner. In the typical grocery store environment there are multiple scanners in operation, each one of them beeping when reading items, and there are other ambient noises as well. The scanner-scale 5 is provided with one or more visual indicator lights, such as indicator 45 on the left side of the upper housing section. The indicator 45 is disposed at a low location proximate to the weigh platter 20. Alternately, an indicator 46 may be disposed on the right side of the upper housing section at a higher location. The indicators 45, 46 may operate separately, with the left indicator 45 alighting when the detector 42 detects a break in the light beam 39 and the right indicator 46 alighting when the detector 40 detects a break in the light beam 38. Alternately both indicators may alight when either detector 42 detects a break in the light beam 39 or when the detector 40 detects a break in the light beam 38.

Preferably, the light source 26, 26a associated with the platter perimeter protection beams 32, 33 is a near-infrared (NIR) LED which is invisible to the human eye, but may alternately be in the visible range.

Other item overhang detection schemes may be employed such as described in U.S. Published Patent Nos. 2010/0139989 and 2011/0232972, or U.S. Pat. No. 6,085,979 hereby incorporated by reference. FIGS. 19-22 and FIGS. 23-25 of U.S. Published Application No. 2011/0232972 illustrate particular alternate item overhang detection systems using light guides.

Preferably the weigh platter comprises a two plane weigh platter having a lower platter section containing the horizontal window 22 and an upper platter section 20b containing an upper window 14a as illustrated in FIGS. 2-3. One such two plane weigh system is the All-Weighs® platter system available from Datalogic ADC, Inc. of Eugene, Oreg., further described in U.S. Pat. No. RE40,071 hereby incorporated by reference. FIG. 1 illustrates both sides of the platter 20 including a light guide 30a and detectors 40, 42. The weigh platter 20 includes a foot rail 24, a raised section of the weigh platter at the foot thereof designed to inhibit items from extending off the platter yet not inhibit passing items along the counter laterally across the scanner-scale. The light pipes 30a, 30b (shown in dashed lines) are shown disposed at the ends of the foot rail 24.

In the embodiments of FIGS. 1-3, the foot section 24 is shown extending across an entire width of the platter 20, and includes a central portion 25 (see FIG. 1). Alternately, the platter foot central portion 25 may be omitted, with the light guides 30a, 30b extending into small protrusions disposed just at the corners of the foot of the platter 20. As a result, in that configuration the central portion of the platter 20 between those corner protrusions would be level/continuous with the surface of the rest of the platter.

The system may include software that takes feedback/control signals not only from the detector but also from the Point of Sale system (POS) and/or the weigh scale. Typically, the POS has a weighing function that requires the operator to key in a code for an item, such as fresh produce, that is sold by weight. The off-scale detection system may normally be in an "off" or dormant state, but is activated by various activities, such as (1) being alerted by the POS that a weighing activity is occurring, (2) the weigh scale detecting that an item is on the scale, the weigh scale detecting a mass on the scale that is not changing, meaning that the item is not being moved and must have been placed on the platter with the intent to weigh it. Weight detection (or completion of a successful weighing operation) of an item may be delayed (such as the scale being disabled) until the off-scale detection system determines that the item is not off-scale or the transmission of weight data to the host may be delayed until the off-scale detection system enables this action.

It may be desirable to keep the indicator(s) in an off state until it is determined that a weighing operation is occurring. Thus in one embodiment, the indicators are kept in the off state to keep the indicator(s) from flashing unnecessarily during scanning operations. During scanning, items being scanned may intermittently block the perimeter light beams, though this intermittent blocking may be of little or no consequence to the transaction until a weighing operation is being performed. Thus, inhibiting the indicator until a weighing operation is underway will avoid undue distraction to the operator.

One method to determine when a weighing operation is being performed is to determine that the scale is not in motion and that there is more than approximately zero weight on the scale. If items are being scanned, the scale would typically be in motion due to the movement of items being scanned/dragged across the scale, and the indicator(s) should be inhibited. Similarly, if the scale is not in motion, but there is approximately zero weight on the platter, then this zero weight condition with scale not in motion would indicate that there is no weighing taking place, and so again the indicator(s) should be inhibited.

For purposes of description, certain sides of the weigh platter 20 will now be defined. The weigh platter horizontal section 20a may be described as having a generally rectangular shape thus having four sides or edges defined as follows: (1) a proximal side edge is the edge nearest the scanner-scale's vertical section 12, the proximal side may also be described as the customer side; (2) a distal side edge is the farthest from the scanner-scale's vertical section 12 and thus next to the foot rail 24, the distal side may also be described as the checker side because it is the side normally nearest the checker or cashier in a typical installation; (3) a first or right lateral side edge is the lateral side nearest light pipe 30a ; and (4) a second or left lateral side edge is the lateral side proximate light guide 30b.

The US 2010/0139989 application also discloses additional details for controller and alarm modules (particularly with reference to FIG. 2 therein, and the corresponding description, previously incorporated by reference) that may be used in conjunction with and implementing the above-described embodiments.

Figure 4:
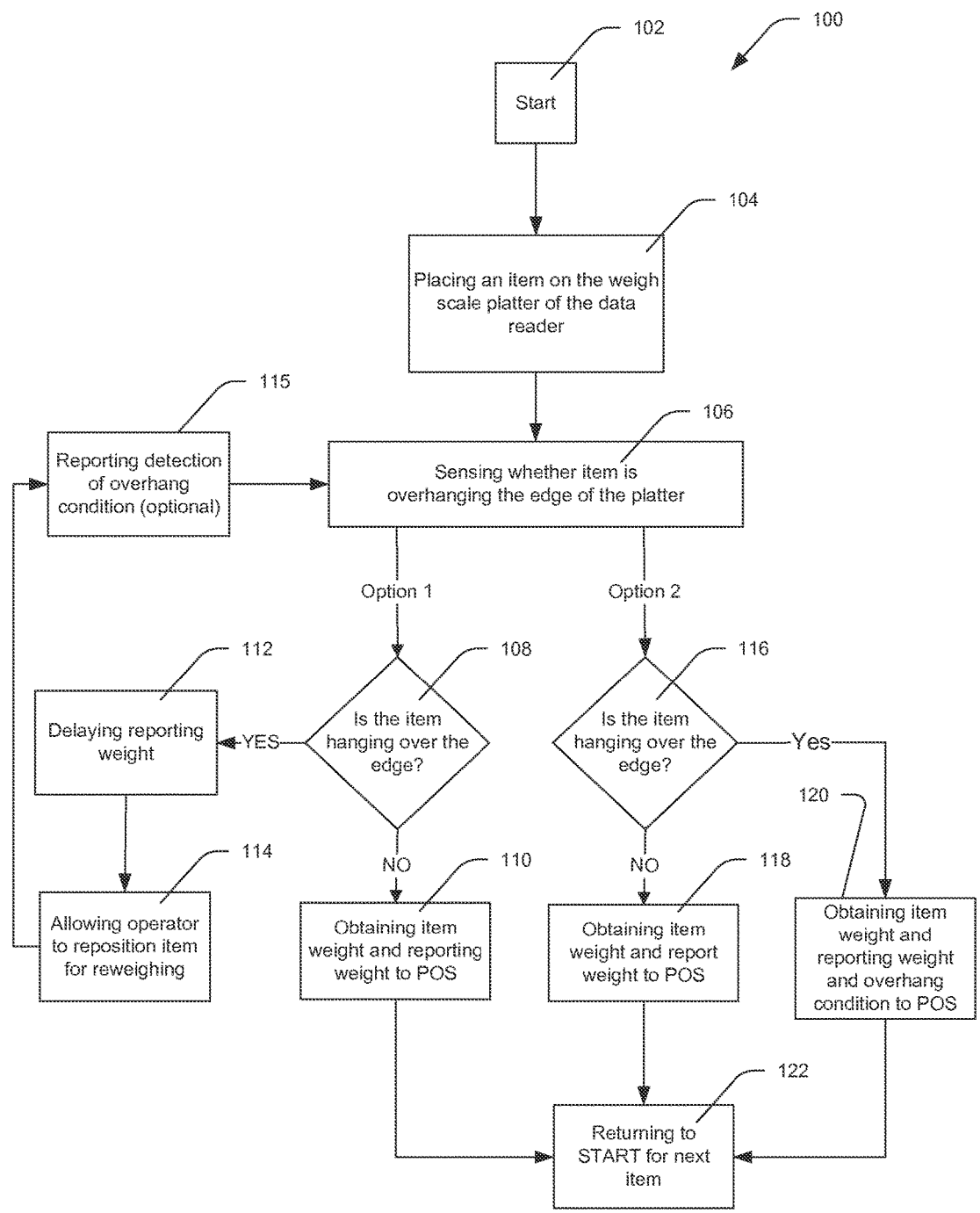
FIG. 4 is a flow chart of a method of operation for preventing inaccurate weighing according to a preferred embodiment.

FIG. 4 is a flow chart of a process/method 100 for handling and responding to detection of items encroaching upon or overhanging the edge of the weigh platter. With respect to the following description, the process 100 will be described and illustrated with reference to overhang or off-scale condition, but the description is intended to be equally applicable to encroachment on the edge of the weigh platter. The process 100 may include the following steps:

Step 102: Start.

Step 104: Placing an item on the weigh scale platter of the data reader for weighing the item.

Step 106: Using one of the methods/systems described above, sensing whether the item is encroaching upon or overhanging an edge of the platter, an item overhanging the edge thus has potential for weighing error. From this step, two (optional) courses of action may be taken.

Option 1, proceeding to Step 108 for determined whether the item is hanging over the edge. If it is not hanging over the edge of the platter (the No condition), proceeding to Step 110.

Step 110: Obtaining item weight from the scale and reporting the weight to the POS, and then proceed to Step 122 and return to Start Step 102 for next item.

If at Step 108 it is determined that an item is hanging over the edge of the platter (the Yes condition), then proceed to Step 112.

Step 112: Delaying reporting of weight being detected, then proceeding to Step 114 (whereby the weight is not yet reported to the POS).

Step 114: The delay permits the operator to reposition the item for weighing, preferably to position the item such that it does not overhang the edge of the platter. The method/operation then proceeds or returns to Step 106 to re-sense whether there is an overhang condition.

Step 115: The operator is optionally alerted as to the overhang condition and the overhang condition is optionally reported to the POS.

Option 2, proceeding from Step 106 to Step 116 for determining whether the item is hanging over the edge. If it is not hanging over the edge (the No condition) proceeding to Step 118.

Step 118: Obtaining item weight from the scale and reporting the weight to the POS, and then proceed to Step 122 and return to Start for next item.

If at Step 116 it is determined that that an item is hanging over the edge (the Yes condition), then proceed to Step 120 where item weight is obtained and both the overhang condition and the item weight are reported to the POS or host. The overhang condition data may be appended to the item ID data obtained by the data reader, separately sent to the POS/host, or via another suitable reporting method. Alternately, the operator may be alerted as to the overhang condition and given the opportunity to correct, but even if no action is taken, the weight is nonetheless obtained and reported under this Option 2 process.

Once the item weight is obtained and reported, the process proceeds to Step 122 for returning to the Start Step 102.

The data pertaining to the off-scale/overhanging condition may be reported by appending data to the weight information or sending an extra message pertaining to the overhang condition, separate from the weight data, such as in a "special" or "phantom" barcode (i.e., non-item identification data such as disclosed in U.S. Pat. No. 7,527,198 hereby incorporated by reference) or as special PLU (price look-up) data.

Thus the scale perimeter protection system may be configured to inhibit weighing operations until it is determined that there is no item in an off-scale condition. Following are several methods by which the system may inhibit the weighing operation:

The system may inhibit the transmission of weight data to the POS terminal until it detects the off-scale item condition is cleared.

The system may send clearly invalid weight data to the POS terminal, which can be interpreted by the POS terminal as such, until it detects the off-scale item condition is cleared.

The system may send an indication to the POS terminal that the scale data is unavailable or invalid or some other status message until it detects the off-scale item condition is cleared. When weighing, a scale typically has an "in-motion" determination capability. As long as the user is moving objects on the platter, the scale is in-motion and will not settle on a weight value (and will thus delay sending any weight value to the POS until settling on a weight value). Alternately, the scale system may send an in-motion scale status to the POS terminal. In one method, the off-scale state may be communicated to the POS by sending an "in motion" scale status to the POS terminal, which is an indication from the scale which is typically already in use by scanner-scale-POS systems to defer weighing operations until the "in motion" status is no longer transmitted.

The detection of an item overhang condition may produce reporting of inaccurate weight data from the scale device. The various detectors devised to sense the occurrence of such a possible state are operable to both warn the operator by various visible and/or audible indications as well as to optionally disable transmission of weight data until the condition is cleared. The perimeter detection system may alternately be configured to report additional data about the condition of weigh scale veracity when the condition of off-scale weighing occurs providing useful insight to store operations.

In one example, if the scale receives a weight request from a connected POS device and the overhanging condition is sensed by the detectors, the system may respond with a weight and some extra appended data that indicates (a) the overhanging condition; (b) identification of which side of the platter is affected. This feature may be particularly useful for stores that are transitioning to new scanner/scale systems that include such a scale perimeter monitoring option. It may be desirable to not fully disable weight reporting during an overhanging condition as it may be determined that such disabling may negatively affect store throughput until personnel get used to the new system. This option allows monitoring how often weight transactions may be incorrect, which can be useful in store loss analysis and operator training evaluations.

Heretofore, the output from the item overhang detection system has been described and used solely for weighing operation, but the output from the item overhang detection system may be used for an alternate function of the scanner-scale independent of weighing operation, such as the example alternate functions set forth in the following. Alternately, an item tracking system (such as one detecting items entering and exiting a read zone) that is not an overhang detection system may be employed to initiate one of the above listed alternate functions.

Scanner-Scale Wakeup—using the output from the item overhang detection system as a wake-up signal for prompting the scanner-scale to switch from a sleep state to an active state.

Scanner-Scale Sleep Mode Control—using the output from the item overhang detection system for keeping the scanner scale in an active state.

Monitor Scan Speed—using output from the item overhang detection system to monitor item scan speed by sensing an item passing by an upstream edge of the weigh scale and subsequently sensing the item passing a downstream edge of the weigh scale, measuring the time between detections, knowing the distance between upstream and downstream edges, the scan speed can be calculated.

Monitoring Scan Technique—using output from the item overhang detection system to monitor operator scanning technique by sensing progression of an item passing successive edges of the weigh scale. A preferred ergonomic method for moving items through the read zone of a scanner-scale is to slide the items over the weigh platter, allowing the platter to bear most or at least a portion of the weight of the items rather than requiring the operator to lift them. The overhang detection system allows monitoring of the operator's technique (i.e., detecting if an item has been slid across the platter) by observing the states of the upstream and downstream detectors immediately before and after an item has been read by the scanner. If the upstream sensor indicates a momentary blocked beam condition, then the item is subsequently read, and then the downstream sensor indicates a momentary blocked beam condition, the item was most likely slid from one side of the platter to the other in order to read the code on the item. This sequence of events indicates a proper ergonomic scanning method. The system may keep statistics on the number of properly scanned items and/or the ratio of properly scanned items to the total number of scanned items, or some other related metric.

Alternate Scan Monitoring Technique—A preferred scanning technique for a scanner-scale in the retail setting such as a grocery store is to move items through the read region, passing the upstream edge of the weigh platter and then the downstream edge of the weigh platter, with the item moved with a minimum of orienting/twisting and dragged across the weigh platter (dragging the item tends to minimize the item weight and thus the strain exerted by the operator moving the item). The detection beams 38, 39 (see FIGS. 2-3) are fairly low and close to the weigh platter surface. If an item is dragged across the weigh platter it is likely to pass through the detection beams 38, 39 and be detected. Thus if the item is detected, that detection is indicative of dragging and thus good scanning technique. If an item is lifted over the detection beams 38, 39 and thus not detected, that non-detection may be indicative of the item being lifted and not dragged and thus poor scanning technique.

The detection data output pertaining to the scan technique may be coordinated with the item identification: reading an optical code on the item being moved through the read zone to obtain item identification data; appending the output information from the item overhang detection system to the identification data; and transmitting the item identification data and the output information to a host or POS. Coordinating the item to the operator scan technique may provide useful data for analysis such as certain items (e.g., a can of soup) detected as being dragged, while other items, such as a heavy 12-pack of soft drinks, is not detected as being dragged.

First Pass Read Detection—determining whether an item has been read on a first pass through the read zone by (a) using the output from the item overhang detection system to detect an item passing an upstream edge of the weigh scale; (b) reading an optical code on the item being moved through the read zone to obtain item identification data; (c) using the output from the item overhang detection system to detect the item passing a downstream edge of the weigh platter; and (d) determining that the item has been read on a first pass through the read zone if the item was read after being detected to have passed the upstream edge of the weigh platter and before being detected to have passed the downstream edge of the weigh platter. The consecutive detections of (1) upstream edge, (2) barcode read in the read zone, and (3) downstream edge thus provide an indication of whether an item was read on a first pass. In another example, If the detection sequence is (1) upstream edge (entering the read zone), (2) downstream edge (leaving the read zone), (3) downstream edge again (reentering the read zone from the exit side), (4) barcode read in the read zone, (5) downstream edge (exiting the read zone), then it is apparent that the item was not read on the first pass, but read on the second pass.

A first pass read rate may be calculated by storing a count of a set of items (e.g., all items in a particular transaction or time frame, such as a shift) passing over the scanner-scale and then calculating a ratio of successful first-pass read count divided by the count of the set of items.

Double-Read Detection—In barcode reading, the barcode is (normally) actually read several times as it is passed through the read zone. Of course, it is desired that a particular item only be reported once, otherwise the reader might detect and acknowledge multiple instances of that one item. Thus barcode scanners are provided with double-read prevention so that the same item is not reported more than once. The double-read prevention must allow for a second like item (e.g., a second can of the same Acme Chicken Soup) to be read and reported in succession. One method of double-read prevention employs a timer, e.g., a countdown timer that starts counting down once a barcode is successfully read. A subsequent read of the same barcode within the countdown time (e.g., before the countdown timer expires) presumes it is the same item, ignores the subsequent read, and resets the timer. Once the timer has expired, it is presumed that the subsequent read of a like item is a new item (e.g., a second can of the same Acme Chicken Soup) and allows the second can to be read and reported. The item overhang detection system may be used in double-read prevention systems/methods. The upstream edge detection and the downstream edge detection may be used to monitor an item being moved into and out of the read zone. Several detection sequences are possible.

Double-Read Control Scheme, Example 1—In a first example, an item is (a) detected as passing the upstream edge, then (b) a good read in the read zone (initiating a good read "beep" acknowledgment), then (c) detection of an item passing the downstream edge. Having detected this sequence, it is presumed that a single item entered the read zone from the upstream side, the item then read, and then that item exited through the downstream side after having been read.

Double-Read Control Scheme, Example 2—Following the sequence of Example 1, and further in sequence (d) another passing of the downstream edge, and (e) a good read of a same item as in step (b) in the read zone (i.e., after the timer has timed out). Here it is presumed that the same item that the operator has read in (b) has been inadvertently returned by the operator back into the read zone. The second read of this item may be deferred/prevented, such as no good read acknowledgment at step (e) and the operator optionally notified to take corrective measure such as verify that it is indeed a second like item to be purchased or verify that the item is the same one and is moved to bagging.

Scan Speed Enhancement, Example 1—In an alternate sequence, a first item is (a) detected as passing the upstream edge, then (b) a good read in the read zone (initiating a good read "beep" acknowledgment), then (c) detection of an item passing the downstream edge, then before the double-read timer has expired, (d) a second item is detected passing the upstream edge and (e) a good read in the read zone. This fast reading may occur when an operator is rapidly passing items (such as by using both hands, a two-hand pass) with the first item with one hand (e.g., the right hand) and the second item with the other hand (i.e., the left hand). If the second item in (e) is different than the item in (b), then the double read system will identify and permit a good read (even if the double-read timer is still active from the first item). If the second item in (e) is identified as a like item as the first item (e.g., another can of Acme Chicken Soup), the double-read timer would normally prevent the second item from being acknowledged, however, since the first item was detected as having exited the read zone on the downstream edge, the double-read timer may be set to zero upon the item's exit, allowing a subsequent duplicate item to be read without having to wait for the entire double-read timer delay. This process may be repeated, allowing any number of similar items to be read in quick succession.

Scan Speed Enhancement Example 2—In an alternate sequence, a first item is (a) detected as passing the upstream edge, then (b) a good read in the read zone (initiating a good read "beep" acknowledgment), then before the double-read timer has expired, (c) a second item is detected passing the upstream edge and (d) a good read in the read zone. This fast reading may occur when an operator is rapidly passing items (such as by using both hands, a two-hand pass) with the first item with one hand (e.g., the right hand) and the second item with the other hand (i.e., the left hand). If the second item in (e) is different than the item in (b), then the double read system will identify and permit a good read (even if the double-read timer is still active from the first item). If the second item in (e) is identified as a like item as the first item (e.g., another can of Acme Chicken Soup), the double-read timer would normally prevent the second item from being acknowledged, however, since the first item was successfully read, it is presumed that the first item actually exited the read zone (i.e., even without detection by the downstream edge). Moreover, it is unlikely that the operator would take the first item that was successfully read (getting the good read "beep") back across the upstream edge, thus it is presumed that the second item is another item and thus a good read of the second item is acknowledged by forcing early expiration of the double read timer. Thus in this Example 2 it is presumed that the second item is a new item entering the read zone (rather than the same first item) and a good read will be permitted and acknowledged.

Figure 5:
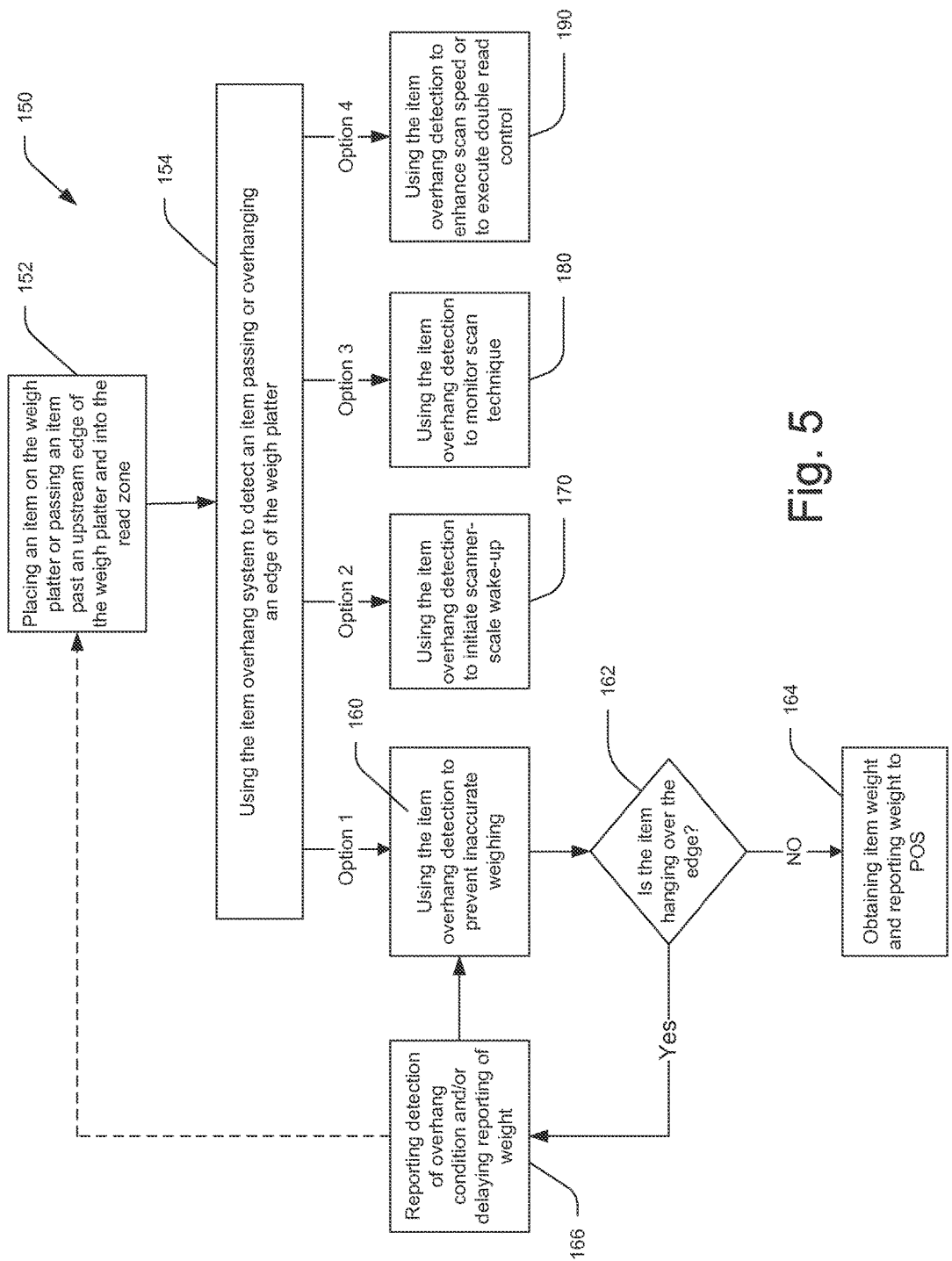
FIG. 5 is a flow chart illustrating operation of a combined system using output of the item overhang system.

FIG. 5 is a flow chart illustrating operation of a combined system. With respect to the following description, the process 150 will be described and illustrated with reference to overhang or off-scale condition, but the description is intended to be equally applicable to encroachment on the edge of the weigh platter. The process 150 may include the following steps:

Step 152: Placing an item on the weigh scale platter of the data reader for weighing the item or passing an item into or through the read zone.

Step 154: Using one of the item overhang detection methods/systems described above, sensing whether the item is encroaching upon or overhanging an edge of the platter, or has passed one of the platter edges. From this step, several (optional) courses of action may be taken.

Option 1: Step 160, using the item overhang detection system to prevent inaccurate weighing.

Step 162: determining whether the item is hanging over the edge. If overhang is detected, proceed to Step 166, if overhang is not detected, proceed to Step 164.

Step 164: Obtaining item weight and reporting weight to POS.

Step 166: Reporting detection of overhang condition and/or delaying reporting of weight, then returning to Step 160 or Step 152.

Option 2: Step 170, using the item overhang detection to initiate scanner-scale wake-up, or controlling sleep mode.

Option 3: Step 180, using the item overhang detection to monitor scan technique.

Option 4: Step 190, using the item overhang detection to enhance scan speed or to execute double read control.

Other Options: Other optional uses for the item overhang detection output are as described above. These options for using the output of the item overhang detection may be operative for various configurations and for an alternate function of the scanner-scale independent of weighing operation.

Figure 6:
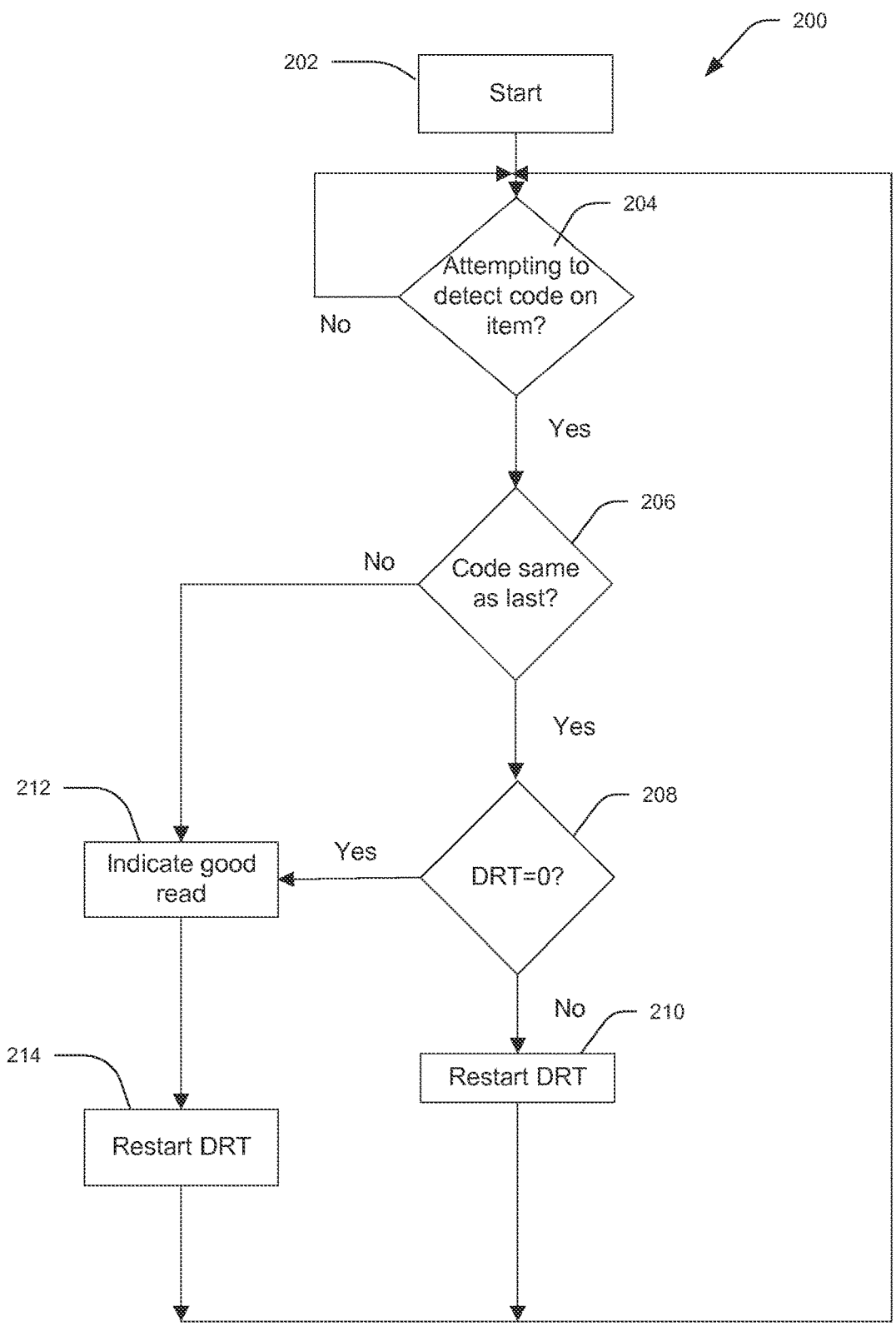
FIG. 6 is a flow chart of a conventional double read prevention method using a double read timer.

FIG. 6 is a flow chart of a conventional double read prevention method 200 employing a double read timer (DRT), according to the following steps.

Step 202: Start.

Step 204: Attempting to detect/read an optical code on an item. If No, return and repeat Step 204. If Yes, proceed to Step 206.

Step 206: Determining if the code read in Step 204 is the same as the last code previously read. If Yes, proceed to Step 208; if No (since the code detected is different, the item is not the same) proceed to Step 212 to indicate good read.

Step 208: Determining if the DRT=0 (i.e., has expired). If it has expired (Yes), meaning that there has been enough time since the same code has been consecutively read (meaning that it is assumed that the second item, though also a can of Acme Chicken Soup, is a new item), proceeding to Step 212 to indicate good read. If No, proceed to Step 210 (because not enough time has elapsed since a like item is detected, it is assumed that it is the same item).

Step 212: Indicating good read and proceed to Step 214 to restart DRT. Steps 212 and 214 may be in either order or at the same time. After indicating the good read and restarting the DRT, the process proceeds back to Step 204 for reading the next item.

Step 210: Coming from Step 208 "No" because not enough time has elapsed before a like item has been read, restarting the DRT and returning to read another (or same) item.

Figure 7:
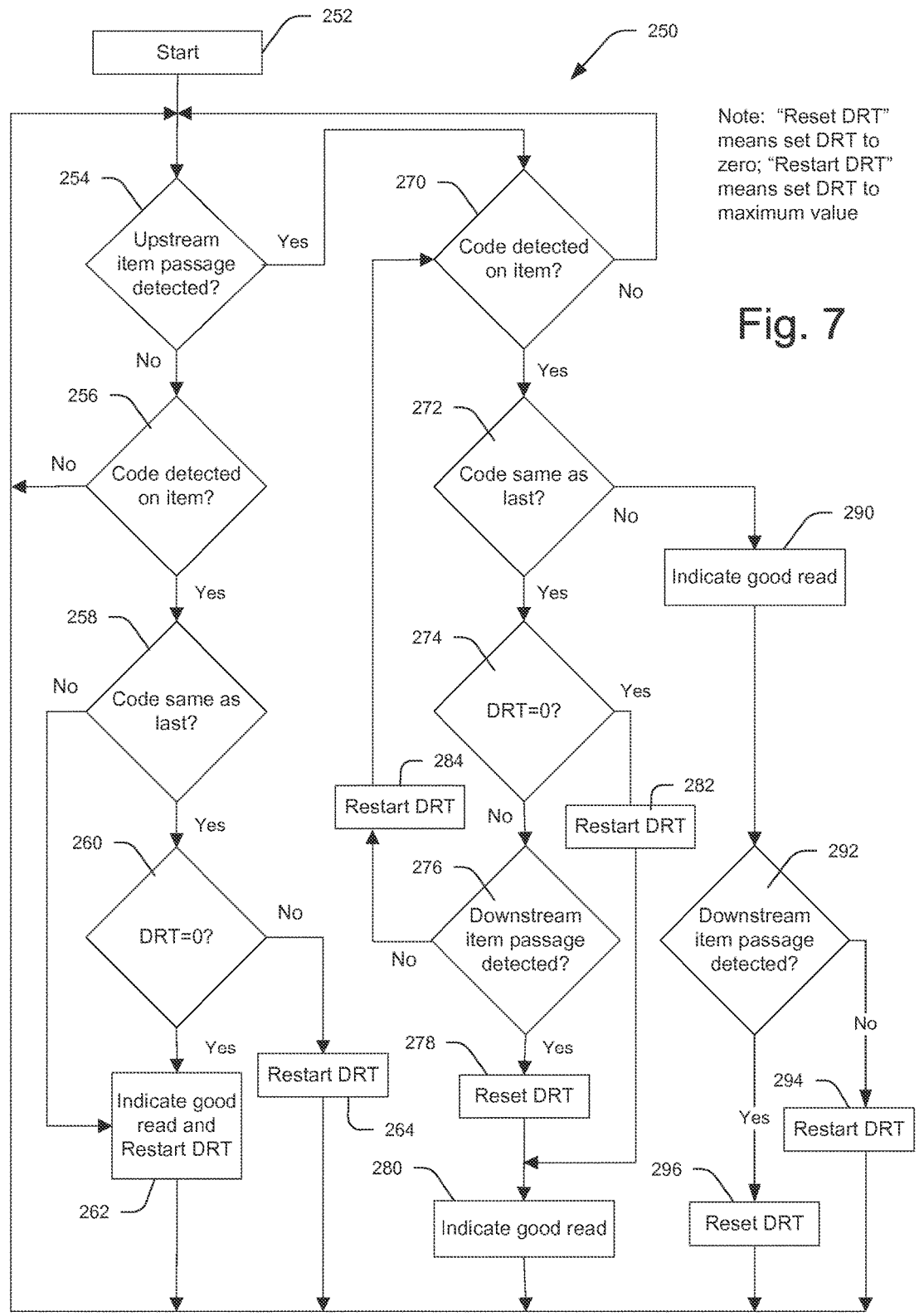
FIG. 7 is a flow chart of a method of using output of the item overhang system in combination with a double read prevention system.

FIG. 7 is a flow chart of a method 250 of using output of the item overhang system in combination with a double read prevention system, but with time reduction using the upstream detector, according to the following steps.

Step 252: Start.

Step 254: Using the item overhang system to detect an item passage at the upstream edge of the weigh platter. If Yes, proceed to Step 270; if No proceed to Step 256. By "item passage" it is meant that the upstream edge detector would detect a separate item rather than for example repeatedly detecting one large package that is moved into the read zone yet continues to overlap the upstream edge and is continuously detected at the upstream edge. Detecting an "item passage" would then be considered detecting a temporary presence, such that the item is detected and then not detected at the upstream edge, which would indicate that the item had passed the upstream edge presumably into the read zone since it is subsequently read by the data reader.

Step 256: Since the no item was detected as passing upstream edge as in Step 254, the method at Steps 256 through 262 employs conventional double read prevention—attempting to detect a code on the item. If Yes, proceed to Step 258; if No return to Step 254.

Step 258: Determining if the code detected in Step 256 is the same code as the last code previously detected (i.e., double-read detection). If Yes proceed to Step 260; if No (meaning that the item is not the same, so it is okay to acknowledge) proceed to Step 262.

Step 260: Determining if the DRT=0 (i.e., has the double read timer expired?), and if Yes, sufficient time has elapsed since the last like item read to assume it is a new item, then proceed to Step 262.

Step 262: From "Yes" in Step 260, indicate good read and restart DRT, return to Step 254.

Step 264: From "No" in Step 260, restart the DRT, then return to Step 254.

Step 270: Coming from a "Yes" from Step 254, the item overhang system has detected that an item passed the upstream edge, determining if a code is detected. If No, return to Step 254; if Yes proceed to Step 272.

Step 272: determining if the code detected is the same as the last code detected—if No proceed to Step 290 (indicate good read); if Yes proceed to Step 274 (for double-read determination).

Step 274: Determining if the DRT=0 (i.e., has it expired), and if Yes, sufficient time has elapsed since the last like item read to assume it is a new item, then proceed to restart the DRT (Step 282) and indicate good read (Step 280); if No proceed to Step 276.

Step 276: Determining if an item has been detected passing the downstream platter edge (item passage). If No, then there is no separate indication that the item has left the scan zone, so a like item detected within the DRT is assumed to be the same item, proceed to Step 284, restarting the DRT and then return to Step 270. If Yes, the system has an indication that the item has left the scan zone, so the like item though detected within the DRT is assumed to be a second item, proceed to reset DRT (Step 278) and indicate good read (Step 280). By "item passage" it is meant that the downstream edge detector would detect a separate item rather than for example repeatedly detecting one large package that was moved into the read zone, and over the downstream edge, yet continues to be in the read zone as well as overlap the downstream edge and is continuously detected at the downstream edge. Detecting an "item passage" would then be considered detecting a temporary presence, such that the item is detected and then not detected at the downstream edge, which would indicate that the item had passed the downstream edge presumably out of the read zone since it is previously read by the data reader.

Step 278: Resetting the DRT—because the item was detected as having been read, good read indicated and exit the scan zone downstream, the DRT is reset and immediately return to Step 254 and allow the next to be read without requiring the DRT to expire thus enhancing scan speed.

Step 290: proceeding from a "No" from Step 272, indicating a good read and then proceed to Step 292.

Step 292: determining if an item was detected passing the downstream edge (item passage), which would indicate the item having exited the scan zone. If No, restart DRT (Step 294) and the return to Step 254 (using the DRT). If Yes proceed to Step 296. By "item passage" it is meant that the downstream edge detector would detect a separate item rather than for example repeatedly detecting one large package that was moved into the read zone, and over the downstream edge, yet continues to be in the read zone as well as overlap the downstream edge and is continuously detected at the downstream edge. Detecting an "item passage" would then be considered detecting a temporary presence, such that the item is detected and then not detected at the downstream edge, which would indicate that the item had passed the downstream edge presumably out of the read zone since it is previously read by the data reader.

Step 296: Resetting the DRT—because the item was detected as having been read (with a good read indicated) and then having exited the read zone downstream, the DRT is reset (DRT=0) and immediately returned to Step 254 and thus allow the next item to be read without requiring the DRT to expire before permitting a same item to be read thus enhancing scan speed.

FIG. 8 is a flow chart of a simplified method 300 using output of the item overhang system in combination with a double read prevention system.

Step 302: Start.

Step 304: Using the item overhang system, attempt to detect an item passage at the upstream edge of the weigh platter. If Yes, proceed to Step 306; if No proceed to Step 308. By "item passage" it is meant that the upstream edge detector would detect a separate item rather than for example repeatedly detecting one large package that is moved into the read zone yet continues to overlap the upstream edge and is continuously detected at the upstream edge. Detecting an "item passage" would then be considered detecting a temporary presence, such that the item is detected and then not detected at the upstream edge, which would indicate that the item had passed the upstream edge presumably into the read zone since it is subsequently read by the data reader.

Step 306: Since an item has been detected as having passed by the upstream edge in Step 304, the DRT is reset to zero (i.e., expired) and then proceed to Step 308.

Step 308: Attempting to detect a code on the item. If Yes, proceed to Step 310; if No return to Step 304.

Step 310: Determining if the code detected in Step 308 is the same code as the last code previously detected (i.e., double-read detection). If Yes, proceed to Step 312; if No (meaning that the item is not the same, so it is okay to acknowledge) proceed to Step 316.

Step 312: Determining if the DRT=0 (i.e., has the double read timer expired?), if No, proceed to Step 314, but if Yes, sufficient time has elapsed since the last like item read to assume it is a new item, then proceed to Step 316. It is noted that from Step 306, if the item had been detected at Step 304 as passing the upstream detection edge, the DRT had been reset to zero, thus even if the double-read timer would had not otherwise have expired, the DRT was reset (presuming the prior item had left the read zone and it is a new item entering the read zone as detected at the upstream detection).

Step 316: From "Yes" in Step 312, indicate good read and restart DRT, return to Step 304.

Step 314: From "No" in Step 312, restart the DRT, then return to Step 304.

Thus while certain preferred embodiments and applications have been shown and described, it will be apparent to those having skill in the art that many changes may be made to the details of the above-described embodiments without departing from the underlying principles of the invention. The scope of the present invention should, therefore, be determined only by the following claims.

The invention claimed is:

1. A scanner-scale system for passing items to be read through a read zone of the scanner-scale, comprising
an item identification system operable for obtaining item identification data of an item as it is passed through the read zone;
a weigh platter;
an item overhang detection system operable for providing an output upon sensing that an item overhangs beyond an edge of the weigh platter, wherein the overhang detection system is operable to both (1) reduce erroneous weighing upon sensing that an item overhangs beyond an edge of the weigh platter and (2) initiate an alternate function of the scanner-scale independent of weighing operation;
wherein the alternate function comprises the item identification system being operable to use output from the item overhang detection system for detection of exit and entry of items for allowing successful reading of multiple items having the same identification data using a double-read timer and without requiring expiration of the double-read timer.

2. A scanner-scale system according to claim 1 further comprising a controller operable to use the output from the item overhang detection system as detection of exit and entry of items from the read zone to control a double-read prevention scheme.

3. A scanner-scale system for passing items to be read through a read zone of the scanner-scale, comprising
an item identification system operable for obtaining item identification data of an item as it is passed through the read zone;
a weigh platter;
overhang detection means for sensing that an item overhangs beyond an edge of the weigh platter;
a controller operable to both (1) reduce erroneous weighing upon the overhang detection means sensing that an item overhangs beyond an edge of the weigh platter and (2) initiate an alternate function of the scanner-scale independent of weighing operation;
wherein the alternate function comprises the item identification system being operable to use output from the item overhang detection system for detection of exit and entry of items for successfully reading multiple items having the same identification data using a double-read timer and without requiring expiration of the double-read timer.

4. A method of operating a scanner-scale, comprising the steps of
passing items through a read zone over a weigh platter of the scanner-scale;

obtaining item identification data of an item as it is passed through the read zone;

providing the scanner-scale with an item overhang detection system, wherein the overhang detection system is operable for providing an output upon sensing that an item overhangs beyond an edge of the weigh platter;

during weighing operation, using the output from the item overhang detection system to reduce erroneous weighing upon sensing that an item overhangs beyond an edge of the weigh platter;

using output from the item overhang detection system for an alternate function of the scanner-scale independent of weighing operation, wherein the alternate function comprises using output from the item overhang detection system for detection of exit and entry of items from the read zone to allow reading of consecutive items having the same code using a double-read timer and without requiring expiration of the double-read timer.

5. A method according to claim 4 wherein using the output from the item overhang detection system to reduce erroneous weighing comprises signaling or alerting an operator that an off-scale condition is detected.

6. A method according to claim 4 wherein using the output from the item overhang detection system to reduce erroneous weighing comprises delaying notification of a successful weighing operation until item overhang is no longer sensed by the item overhang detection system.

7. A method according to claim 4 further comprising
operating the item overhang detection system during a sleep state of the scanner-scale;
using the output from the item overhang detection system as a wake-up signal for prompting the scanner-scale to switch from the sleep state to an active state.

8. A method according to claim 4 wherein the alternate function of the scanner-scale further comprises using the output from the item overhang detection system as a wake-up signal for prompting the scanner-scale to switch from a sleep state to an active state.

9. A method according to claim 4 further comprising
during scanning operation, using output from the item overhang detection system to monitor item scan speed by sensing an item passing by an upstream edge of the weigh scale and subsequently sensing the item passing a downstream edge of the weigh scale.

10. A method according to claim 4 wherein the alternate function of the scanner-scale further comprises using the output from the item overhang detection system to monitor item scan speed by sensing an item passing by an upstream edge of the weigh scale and subsequently sensing the item passing a downstream edge of the weigh scale.

11. A method according to claim 4 further comprising
during scanning operation, using output from the item overhang detection system to monitor operator scanning technique by sensing progression of an item passing successive edges of the weigh scale.

12. A method according to claim 4 wherein the alternate function of the scanner-scale further comprises using the output from the item overhang detection system to monitor operator scanning technique by sensing progression of an item passing successive edges of the weigh scale.

13. A method according to claim 4 further comprising
reading an optical code on the item being moved through the read zone to obtain the item identification data;
appending output information from the item overhang detection system to the identification data for transmitting the item identification data and the output information to the POS.

14. A method according to claim 4 wherein using output from the item overhang detection system to initiate an alternate function further comprises determining whether an item has been read on a first pass through the read zone by
(a) using the output from the item overhang detection system to detect an item passing an upstream edge of the weigh scale;
(b) reading an optical code on the item being moved through the read zone to obtain item identification data;
(c) using the output from the item overhang detection system to detect the item passing a downstream edge of the weigh platter;
(d) determining that the item has been read on a first pass through the read zone if the item was read after being detected to have passed the upstream edge of the weigh platter and before being detected to have passed the downstream edge of the weigh platter.

15. A method according to claim 4 wherein using output from the item overhang detection system to initiate an alternate function further comprises the steps of
1) detecting an item passing an upstream edge of the weigh scale;
2) after the item has passed the upstream edge of the weigh scale, attempting to read an optical code on the item and determining if the code has been successfully read;
3) detecting the item passing a downstream edge of the weigh platter;
4) storing a successful first-pass read count as the sum of items in which all three steps 1-3 occur consecutively and the step 2 was a successful reading of the optical code.

16. A method according to claim 15 further comprising determining a first-pass read rate by
storing a count of all items passing over the scanner-scale;
forming a ratio of successful first-pass read count divided by the count of all items.

17. A method according to claim 4 wherein using output from the item overhang detection system to initiate the alternate function further comprises the steps of
detecting downstream exit of a first item having been previously successfully read within a double-read timer;
resetting the double-read timer and permitting reading of a subsequent second item, having the same code as the first item, without requiring expiration of the double-read timer.

18. A method of operating a scanner-scale according to claim 4 wherein the step of being operable to use output from the item overhang detection system comprises
reading a first item in the read zone;
permitting a subsequent second item, duplicate of the first, to be read without waiting for expiration of double-read delay upon detection of exit of the first item from the read zone by the item overhang detection system.

19. A method of operating a scanner-scale according to claim 4 wherein using output from the item overhang detection system for detection of exit and entry of items from the read zone to allow reading of consecutive items having the same code using a double-read timer and without requiring expiration of the double-read timer, comprises
(a) via the item overhang detection system, detecting exit through a downstream edge of the read zone of a first item having a first code having been previously successfully read within the double-read timer, (b) via the item overhang detection system, detecting subsequent entry of a second item having a second code through an upstream edge into the read zone, (c) upon detecting, via the overhang detection system, exit of the first item and subsequent entry of the second item, resetting the double-read timer and permitting successful reading of the second code that is the same as the first code without requiring expiration of the double-read timer.

20. A method of operating a scanner-scale according to claim 4 wherein using output from the item overhang detection system for detection of exit and entry of items from the read zone to allow reading of consecutive items having the same code using a double-read timer and without requiring expiration of the double-read timer, comprises (a) reading a first code on a first item in the read zone; (b) upon detecting via the item overhang system a second item entering an upstream edge of the read zone after the code on the first item has been read, permitting successful reading of a second code, the same as the first code, on the second item without requiring expiration of the double-read timer.

* * * * *